D. R. PRICE.
ELECTRICAL MEASURING INSTRUMENT.
APPLICATION FILED FEB. 10, 1913.

1,114,516.

Patented Oct. 20, 1914.

Witnesses
Chas. B Stokes
J. Ellis Glen.

Inventor
David R. Price
by Albert G. Davis
His Attorney

UNITED STATES PATENT OFFICE.

DAVID R. PRICE, OF BRANT ROCK, MASSACHUSETTS, ASSIGNOR TO GENERAL ELECTRIC COMPANY, A CORPORATION OF NEW YORK.

ELECTRICAL MEASURING INSTRUMENT.

1,114,516.   Specification of Letters Patent.   Patented Oct. 20, 1914.

Application filed February 10, 1913. Serial No. 747,386.

*To all whom it may concern:*

Be it known that I, DAVID R. PRICE, a citizen of the United States, residing at Brant Rock, in the county of Plymouth and State of Massachusetts, have invented certain new and useful Improvements in Electrical Measuring Instruments, of which the following is a specification.

My invention relates to electrical measuring instruments, and particularly to instruments of the electrostatic type.

The object of my invention is to provide means for improving the operation and for simplifying the construction of such instruments, and more specifically to provide a novel form of electrostatic measuring instrument of simple and rigid construction.

The novel features which I believe to be characteristic of my invention will be definitely indicated in the claims appended hereto.

The features of construction and mode of operation will be understood by reference to the following description taken in connection with the accompanying drawings which show a preferred embodiment of my invention, and in which—

Figure 1:
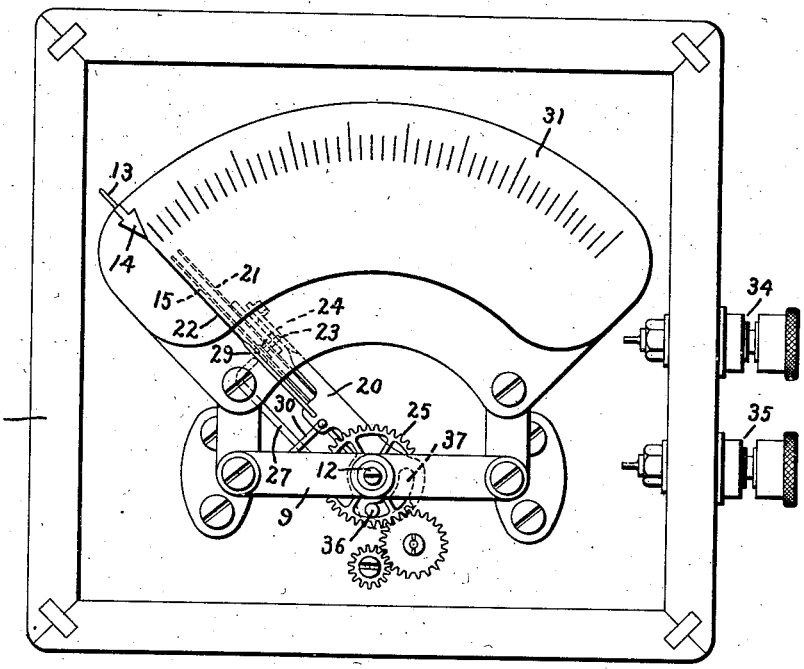
Figure 2:
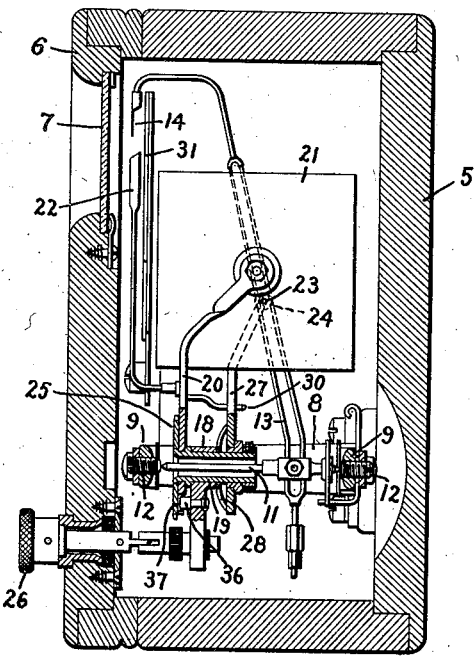
Figure 3:
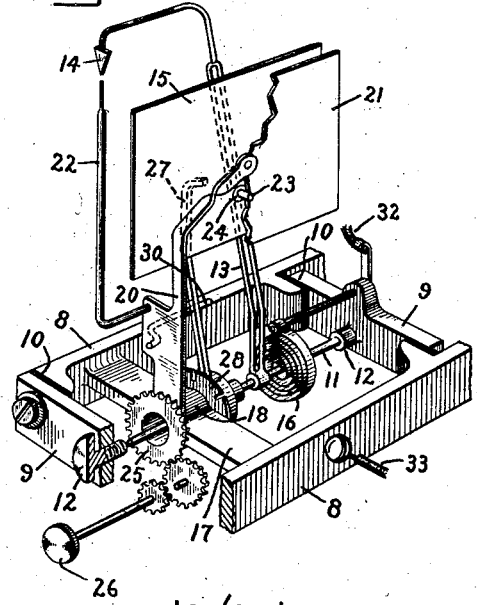

Figure 1 is a plan view of an electrical measuring instrument embodying the novel features of my invention, the cover being removed to more clearly show the moving elements; Fig. 2 is a sectional end view; and Fig. 3 is a perspective view of the moving elements of such instrument.

In the accompanying drawings I have illustrated my invention by way of an electrostatic voltmeter.

The instrument is housed in a casing 5 which may be of any suitable design. The casing is provided with a cover 6 having a glass window 7 of the usual construction. A rectangular supporting frame, comprising side bars 8 and end members 9 secured thereto, is mounted within the casing and serves to support the moving elements of the instrument. The members 9 are insulated from the side bars 8 by pieces of insulating material 10.

A shaft 11 is mounted in bearings 12 carried by the end members 9. One movable element of the instrument is rigidly secured to the shaft 11 and comprises an arm 13 which terminates at its upper end in an indicating pointer 14. A rectangular-shaped vane 15 is secured to the arm 13 intermediate the latter's point of connection to the shaft 11 and the indicating pointer 14. A control spring 16 is secured to the shaft 11 and normally tends to maintain the vane 15 and the pointer 14 in an initial or zero position.

The side bars 8 are rigidly secured together by a transverse member 17. The member 17 is provided near its center with a hollow boss 18 in which is rotatably mounted a hollow sleeve 19. It will be noted from Figs. 2 and 3 of the drawings that the sleeve 19 and the boss 18 surround a portion of the shaft 11. A second movable element is secured to the sleeve 19 and comprises an arm 20 to which is secured a vane 21 and an indicating pointer 22. The vanes 15 and 21 are electrostatically related to each other, and when electrostatic charges of opposite signs are imparted to these vanes, they tend to attract each other. The vanes are prevented from contacting with one another by means of a pin 23 secured to vane 21 and adapted to contact with a piece of insulating material 24 on vane 15. The pin 23 and insulating material 24 thus serve to determine the minimum distance between the vanes. It will, of course, be understood that the vanes may be insulated from each other and the minimum distance between the two movable elements determined in numerous other ways, the construction which I have described being employed merely for the purpose of illustration.

The hollow sleeve 19 is provided with a gear 25 which is operatively connected by means of intermediate gearing to an adjuster 26. The adjuster 26, as will be seen from Fig. 2 of the drawings, is in the nature of a thumb knob and is mounted in the top 6 of the instrument where it is positioned for convenient operation. A pin 36 secured to the transverse member 17 coöperates with a slot 37 in the arm 20 to limit the range of movement of the movable element comprised of arm 20, vane 21 and pointer 22.

An arm 27 is rotatably mounted on the hollow sleeve 19, and a spring collar 28 secured to the stationary boss 18 frictionally engages with the arm 27 and tends to hold the latter in a fixed position. One end of the arm 27 is suitably constructed to form a stop for the vane 15, which latter at its point of contact with the arm 27 is provided with a piece of insulating material 29, which construction is most clearly seen in Fig. 1 of the drawings. A pin 30 carried by the arm 20 performs the dual functions of moving or actuating the arm 27 when the arm 20 is moved in a clockwise direction and of limiting the movement of the arm 27 in a counter-clockwise direction. It will thus be evident that the pin 30 and the arm 27 serve to limit the maximum distance between the vanes 15 and 21.

The pointers 14 and 22 sweep across a suitably positioned scale 31. It will be seen from the drawings that the pointer 14 is constructed to sweep across the top portion of this scale and the pointer 22 to sweep across the lower portion of the scale. The pointers are so related that their indices are in alinement when the vanes 15 and 21 are separated by their minimum distance, that is, when the pin 23 contacts with the insulating material 24 secured to vane 15. The vanes are adapted to be electrostatically charged by means of the leading-in wires 32 and 33 which are connected to terminals 34 and 35 of the instrument.

The operation of the device is as follows: The terminals 34 and 35 are connected to the source of potential which is to be measured. An electrostatic charge of opposite sign is thereby imparted to the vanes 15 and 21. By means of the adjuster 26 and intermediate gearing, the vane 21 is manually rotated in a clockwise direction. The electrostatic attraction between the vanes causes the vane 15 to move correspondingly, and such corresponding movement will continue until the torque exerted by the control spring 16 slightly exceeds the electrostatic attraction between the vanes. While the electrostatic attraction predominates the indices of pointer 14 and 22 will be in alinement, but just as soon as the torque of the control spring 16 exceeds the electrostatic attraction between the vanes the pointer 14 will drop back, that is, will move in a counter-clockwise direction and away from the pointer 22. The position of the pointers on the scale 31, at which pointer 14 thus drops out of alinement with pointer 22, gives a measure of the electrostatic attraction between the vanes, and hence of the unknown voltage which it is desired to measure. The scale will, of course, be appropriately calibrated to read directly in electrical units. When the torque tending to return the movable element comprised of the arm 13, vane 15 and pointer 14 to its initial or zero position exceeds the electrostatic attraction between the vanes 15 and 21, this movable element will have a tendency to return to its zero position. Its movement is, however, limited by the pin 30 and the arm 27 which limit the maximum distance between the vanes 15 and 21. If the adjuster is now operated to move the vane 21 in a counter-clockwise direction, the pin 30 will move out of engagement with the arm 27, but the arm 27 will not move, as the spring collar 28 which is rigidly secured to the stationary boss 18 will hold the arm fixed until vanes 15 and 21 are separated by their minimum distance. It is thus necessary to move back only a short distance in order to pick up the vane 15. It will, of course, be understood that the arm 27 is moved in a clockwise direction by means of the pin 30, whereas such arm is moved in the counter-clockwise direction by the fact of its contact with vane 15.

It will be seen from the foregoing description that I have provided a novel form of electrostatic measuring instrument which is simple and rigid in construction. The instrument takes an extremely small, and under most conditions a practicably negligible, current from the source to be measured and thus in no way disturbs the operating conditions of the circuit.

While I have illustrated and described a specific construction of instrument as the preferred embodiment of my invention, it will of course be understood that numerous modifications may be made therein without departing from the scope of my invention.

What I claim as new and desire to secure by Letters Patent of the United States, is:

1. An electrical measuring instrument comprising two movable elements arranged in electrostatic relation to each other, said elements having substantially coincident paths of movement and each element being movable with respect to the other element and with respect to a fixed part of the instrument, a control spring operatively secured to one of said elements and tending to maintain said element in an initial position, and means for manually moving the other element.

2. An electrical measuring instrument comprising a pivoted vane, means tending to return said vane to an initial position, a second pivoted vane electrostatically related to said first vane, said vanes having substantially coincident paths of movement, means for manually moving said second vane, and means whereby an electrostatic charge may be imparted to each of said vanes.

3. An electrical measuring instrument comprising a spring-controlled movable element, a second movable element electrostatically related to said spring-controlled element, means for manually moving said second element, means for determining the minimum and maximum distances between said elements, and means whereby an electrostatic charge may be imparted to each of said elements.

4. An electrical measuring instrument comprising a spring-controlled movable element, and a second movable element electrostatically related to said first element, the electrostatic relation between said elements being such that a movement of said second element will produce a corresponding movement of said first element as long as the electrostatic attraction between said elements exceeds the torque tending to return the spring-controlled element to its zero position.

5. An electrical measuring instrument comprising two movable elements arranged in electrostatic relation to each other, means for exerting on one of said elements a torque tending to oppose its movement in a forward direction, and means whereby both of said elements may be correspondingly moved in said forward direction as long as the electrostatic attraction between the elements exceeds said opposing torque.

6. An electrical measuring instrument comprising two movable elements arranged in electrostatic relation to each other, means for exerting on one of said elements a torque tending to oppose its movement in one direction, means whereby an electrostatic charge may be imparted to said elements, means for manually moving the other of said elements, and means for indicating as said latter element is moved its position when the electrostatic attraction between said elements equals said opposing torque.

7. An electrical measuring instrument comprising a spring-controlled movable element having an indicating pointer secured thereto, a second movable element electrostatically related to said spring-controlled element and having an indicating pointer secured thereto, means for manually moving said second element, means for determining the minimum distance between said elements, said elements being so arranged that the indices of their respective pointers are in alinement when the elements are separated by their minimum distance, and means whereby an electrostatic charge may be imparted to each of said elements.

8. An electrical measuring instrument comprising two movable elements, an indicating pointer secured to each element, said indicating pointers being arranged to sweep across a suitable scale and said elements being so arranged that the indices of their respective pointers are in alinement when the elements are separated by a predetermined minimum distance, means whereby said elements may be correspondingly moved, and means influenced by the electrical quantity to be measured whereby said elements may be separated by a distance greater than said predetermined distance when the position of one of said pointers on said scale indicates a value greater than the true value of the electrical quantity to be measured.

9. An electrical measuring instrument comprising a spring-controlled movable element, a second movable element electrostatically related to said spring-controlled element, a movable arm positioned to limit the movement of said spring-controlled element in one direction and determining the maximum distance between said elements, a pin secured to said second element and arranged to limit the movement of said arm in one direction and to move said arm when the second element is moved in the opposite direction, and means for manually moving said second element.

10. An electrical measuring instrument comprising a spring-controlled movable element having an indicating pointer secured thereto, a second movable element electrostatically related to said spring-controlled element and having an indicating pointer secured thereto, means whereby an electrostatic charge may be imparted to each of said elements, means for manually moving the second movable element, means whereby a movement of the second movable element may produce a corresponding movement of said first movable element, and means coöperating with said pointers for indicating the position of said second movable element at which the electrostatic attraction between said elements equals the torque exerted on said first element by its control spring.

11. An electrical measuring instrument comprising a pivoted vane having an indicating pointer secured thereto, means tending to maintain said vane in an initial position, a second pivoted vane electrostatically related to said first-mentioned vane and having an indicating pointer secured thereto, means for manually moving said second vane, means whereby an electrostatic charge may be imparted to each of said vanes, means for maintaining a minimum distance between said vanes, an arm movable with said second movable vane and arranged to determine the maximum distance between said vanes, and a scale across which said pointers are adapted to sweep.

12. An electrical measuring instrument comprising a movable element having a vane and an indicating pointer, a control spring tending to maintain said element in an initial position, a second movable element having a vane and an indicating pointer, the vanes of said elements being arranged in electrostatic relation to each other, means whereby an electrostatic charge may be imparted to each of said vanes, means for manually moving said second movable element, means secured to one of said elements for determining the minimum distance between the vanes, an arm movable with one of said elements and arranged to determine the maximum distance between said vanes, and means coöperating with said pointers for indicating the electrostatic attraction between said vanes.

13. An electrical measuring instrument comprising a movable element having a vane and an indicating pointer, a control spring tending to maintain said element in an initial position, a second movable element having a vane and an indicating pointer, the vanes of said elements being arranged in electrostatic relation to each other, means whereby an electrostatic charge may be imparted to each of said vanes, means for manually moving said second movable element, a movable arm positioned to limit the movement of said spring-controlled element in one direction and determining the maximum distance between said elements, a pin secured to said second element and arranged to limit the movement of said arm in one direction and to actuate said arm when the second element is moved in the opposite direction, means secured to one of said elements for determining the minimum distance between said elements, and a scale coöperating with said pointers.

In witness whereof, I have hereunto set my hand this 7 day of Feb., 1913.

DAVID R. PRICE.

Witnesses:
CHAS. B. DAVIS,
J. S. GENTY.